US011321893B2

(12) United States Patent
Shapiro et al.

(10) Patent No.: US 11,321,893 B2
(45) Date of Patent: May 3, 2022

(54) SIMULATION METHOD AND SYSTEM

(71) Applicant: Sony Interactive Entertainment Inc., Tokyo (JP)

(72) Inventors: Elisheva Shapiro, London (GB); Mandana Jenabzadeh, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/483,488

(22) PCT Filed: Feb. 6, 2018

(86) PCT No.: PCT/GB2018/050329
§ 371 (c)(1),
(2) Date: Aug. 5, 2019

(87) PCT Pub. No.: WO2018/146461
PCT Pub. Date: Aug. 16, 2018

(65) Prior Publication Data
US 2019/0371035 A1  Dec. 5, 2019

(30) Foreign Application Priority Data

Feb. 13, 2017 (GB) ..................... 1702302

(51) Int. Cl.
*G06T 13/40* (2011.01)
*G06T 7/70* (2017.01)
(Continued)

(52) U.S. Cl.
CPC ............. *G06T 13/40* (2013.01); *G06T 7/20* (2013.01); *G06T 7/60* (2013.01); *G06T 7/70* (2017.01); *G06T 13/80* (2013.01)

(58) Field of Classification Search
None
See application file for complete search history.

(56) References Cited

U.S. PATENT DOCUMENTS 9,529,725 B2   12/2016  Hashimoto
2008/0309671 A1   12/2008  Shuster
(Continued)

FOREIGN PATENT DOCUMENTS

WO    2014111985 A1    7/2014

OTHER PUBLICATIONS

International Search Report and Written Opinion for corresponding PCT Application No. PCT/GB2018/050329, 12 pages, dated Mar. 19, 2018.

(Continued)

*Primary Examiner* — Jennifer Mehmood
*Assistant Examiner* — Jed-Justin Imperial
(74) *Attorney, Agent, or Firm* — Matthew B. Dernier, Esq.

(57) ABSTRACT

A method of simulating avatar attention in a virtual environment includes, for a given avatar within the environment; periodically calculating the respective interest value of a plurality of elements in the virtual environment in dependence upon one or more factors, where at least one of said factors is evaluated responsive to a relationship between the respective element and that given avatar, selecting the element with the highest calculated interest value, and causing a representation of that given avatar's eyes to point at the selected element within the virtual environment.

15 Claims, 2 Drawing Sheets

(51) Int. Cl.
G06T 7/20 (2017.01)
G06T 7/60 (2017.01)
G06T 13/80 (2011.01)

(56) References Cited

U.S. PATENT DOCUMENTS

2013/0066885 A1* 3/2013 Komuves ............... G06Q 50/01
707/748
2014/0201209 A1 7/2014 Hashimoto

OTHER PUBLICATIONS

Combined Examination and Search Report for corresponding GB Application No. 1702302.9, 3 pages, dated Jul. 4, 2019.
Examination Report for corresponding GB Application No. 1702302.9, 1 page, dated Jun. 28, 2019.
Notification of Reasons for Refusal for corresponding JP Application No. 2019-543042, 8 pages, dated Nov. 24, 2021.

* cited by examiner

SIMULATION METHOD AND SYSTEM

BACKGROUND

The present invention relates to a simulation method and system.

Virtual environments are being increasingly seen as social spaces. Examples of such social virtual environments have included PlayStation Home® and Second Life®. Such environments have been successful in allowing users to interact in a real-time manner that extends beyond just text communication or indeed just speech, by allowing the user to project their personality through how their avatar (the virtual representation they choose for themselves) looks, and through a repertoire of gestures and poses that can give life to the avatar.

However, with the advent of popular virtual reality hardware such as the PlayStation VR headset, the level of immersion possible in such social virtual environments becomes much greater. The user can feel as though they are in the virtual environment with the other users' avatars, and optionally each avatar can mimic body language and/or gestures captured by a video camera already used as part of the VR tracking system.

However, because such VR systems are worn on the user's head, they serve to obscure the most essential aspect of non-verbal social interaction—the user's face. Without the ability to capture aspects of the user's current facial appearance, this can affect the apparent realism of a user's avatar when viewed by another user.

The present invention seeks to address or mitigate this problem.

SUMMARY

In a first aspect, a method of simulating avatar attention in a virtual environment is provided in accordance with the disclosed embodiments.

In another aspect, an entertainment device adapted to simulate avatar attention in a virtual environment is provided in accordance with alternative embodiments.

Further respective aspects and features of the invention are defined in the appended claims.

BRIEF DESCRIPTION OF THE DRAWINGS

Embodiments of the present invention will now be described by way of example with reference to the accompanying drawings, in which.

DETAILED DESCRIPTION

A simulation method and system are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

A system suitable for implementing the simulation method includes the Sony PlayStation 4.

Figure 1:
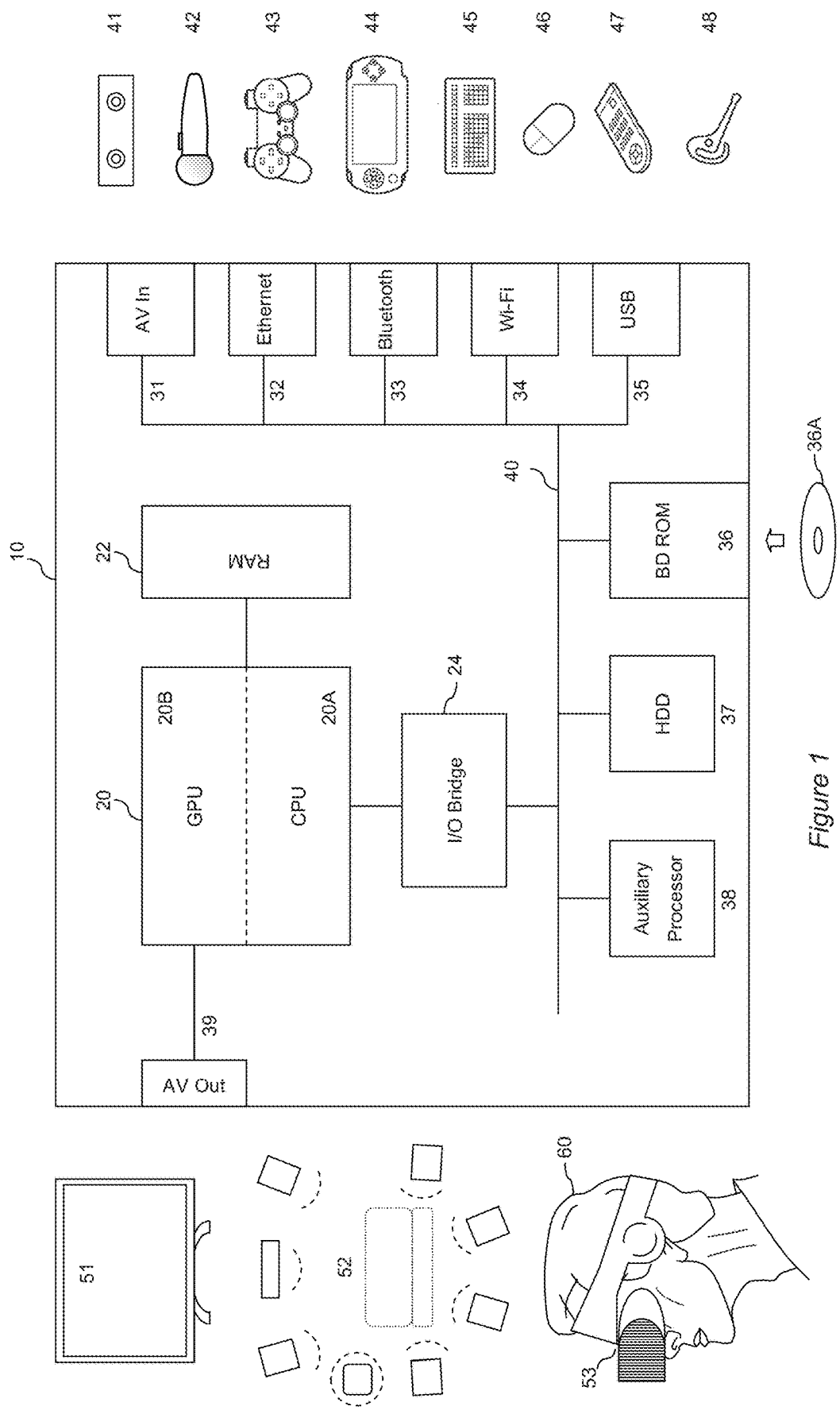
FIG. 1 is a schematic diagram of an entertainment device in accordance with an embodiment of the present invention.

FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B.

The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Regarding peripherals, the system unit is typically provided with at least one hand-held controller 43 such as the DualShock 4®. This controller may be used to interact with user interfaces presented by the system unit that are associated with the operating system and/or a particular game or application being run by the system unit.

The user may also interact with the system unit using a video camera 41 such as the PlayStation Eye®. This may provide monoscopic or stereoscopic video images to the system unit 10 via for example AV input 31. Where these images capture some or all of the user, the user may enact gestures, facial expressions or speech as appropriate to interact with the currently presented user interface.

Alternatively or in addition, a controller designed to assist with camera-based user interaction, such as the PlayStation Move® 42, may be provided. This controller has a wand form factor and an illuminated region that facilitates detection of the controller within a captured video image. Illuminated regions may similarly be provided on other controllers 43, such as on the DualShock 4®. Both kinds of controller comprise motion sensors to detect transverse movement along three axes and rotational movement around three axes, and wireless communication means (such as Bluetooth®) to convey movement data to the system unit. Optionally such controls can also receive control data from the system unit to enact functions such as a rumble effect, or to change the colour or brightness of the illuminated region, where these are supported by the controller.

Finally, in an embodiment of the present invention the video and optionally audio is conveyed to a head mounted display 53 such as the Sony PSVR® display. The head mounted display typically comprises two small display units respectively mounted in front of the user's eyes, optionally in conjunction with suitable optics to enable the user to focus on the display units. Alternatively one or more display sources may be mounted to the side of the user's head and operably coupled to a light guide to respectively present the or each displayed image to the user's eyes. Alternatively, one or more display sources may be mounted above the user's eyes and presented to the user via mirrors or half mirrors. In this latter case the display source may be a mobile phone or portable entertainment device 44, optionally displaying a split screen output with left and right portions of the screen displaying respective imagery for the left and right eyes of the user. Their head mounted display may comprise integrated headphones, or provide connectivity to headphones. Similarly the mounted display may comprise an integrated microphone or provide connectivity to a microphone.

As was noted previously herein, such a head mounted display (HMD) can be used to provide highly immersive experiences such as within a virtual environment shared with one or more other users.

Figure 2:
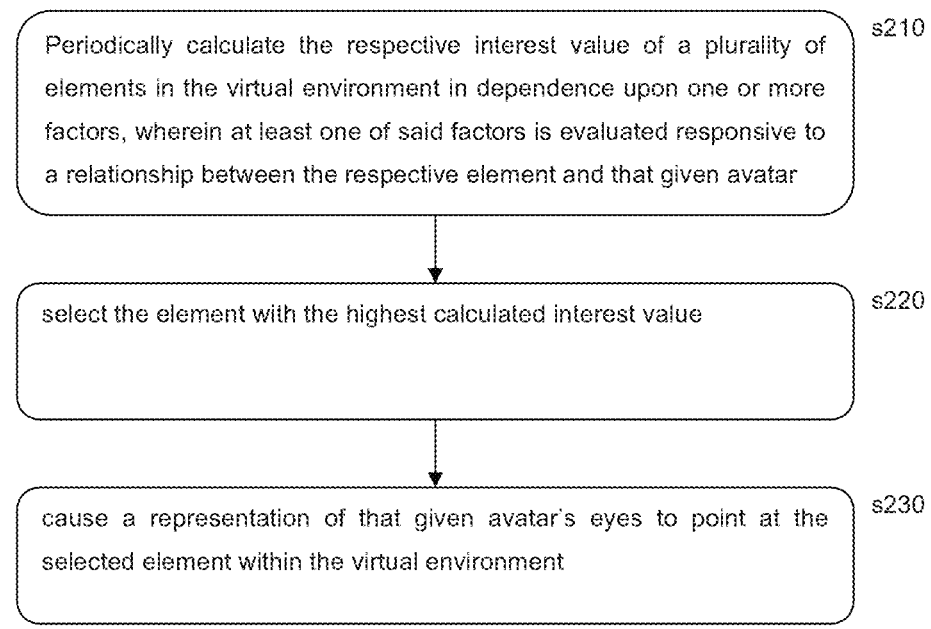
FIG. 2 is a flow diagram of a method of simulating avatar attention in accordance with an embodiment of the present invention.

Referring now to FIG. 2, in an embodiment of the present invention a method of simulating avatar attention in such a virtual environment comprises the following steps for a given avatar within the environment:

In a first step s210, periodically calculating the respective interest value of a plurality of elements in the virtual environment in dependence upon one or more factors, wherein at least one of said factors is evaluated responsive to a relationship between the respective element and that given avatar.

The period may be on a per-frame basis or on a different periodicity. The period may also vary between elements; for example elements that are in motion may be re-calculated more often (e.g. on a per frame basis) than element that are static. Elements may be determined to be in motion or static either by comparing their position in the environment between frames, or by interrogation of a flag indicating motion if such a flag is provided.

Likewise the periodicity may change for a given avatar depending on whether the point of view or direction of field of view of that avatar changes. Hence more generally, the periodicity may be fixed, or may be shorter for elements of the environment for which there is relative motion between the element and the viewpoint of the given avatar.

The interest value is described in more detail later herein, but may be understood to be a value or array of sub-values used to rank elements of the environment in order of interest. Individual sub-values may be weighted (e.g. multiplied) according to designer preference.

Whilst interest values for a plurality of elements are calculated, it will be appreciated that it is not necessary to calculate interest values for every element in the virtual environment. The elements that may be considered for ranking by interest may be indicated by the presence of a flag and/or by the presence of a default interest value (hence a monster may by default command more interest than a table, all other things being equal).

By calculating the interest value of an element for a given avatar based at least in part on at least one of said factors being evaluated responsive to a relationship between the respective element and that given avatar, this allows different avatars within the environment to direct their attention to different things. Whilst these relationship-based factors are described in more detail herein, it will be appreciated that such factors as proximity to an element and whether the element is in the current field of view of the given avatar's user will result in desirable variation in apparent behaviour between avatars.

A second step s220 then comprises selecting the element with the highest calculated interest value. As noted above, the 'highest' value may be a function of weightings for plural factors, and optionally there may be factors (such as certain flags) that are effectively weighted to override all other factors. An example may be a binary value indicative of whether the element is within the current field of view of the user represented by the given avatar. Optionally this value may be determined first, enabling the calculation of interest values for elements that do not satisfy this requirement to be skipped for the current period.

A third step s230 then comprises causing a representation of that given avatar's eyes to point at the selected element within the virtual environment.

It will be appreciated that there are potentially two classes of avatar. The first is the first user's own avatar. It is possible that, in a first person view (or in a third person view where the virtual camera is placed behind the avatar), the first user's own avatar's eyes are never shown to the first user on their entertainment device, or only in specific circumstances such as where there is a reflective surface such as a mirror in the virtual environment.

The second class of avatar are the avatars of other users in the shared virtual environment, for whom at least some data relating to the state of their avatar is received by the entertainment device of the first user, typically via a server administrating the shared virtual environment but potentially directly in a peer-to-peer arrangement.

Consequently, causing a representation of that given avatar's eyes to point at the selected element within the virtual environment may take one of two forms.

The first form involves each user's entertainment device informing the other remote entertainment devices of the other users as to what element of the environment has been selected as being of most interest to the avatar of their respective user. In this case, each avatar only has to calculate the element with the highest calculated interest value for their own user's avatar, and receives the elements for the other avatars via the network, either via the administrative server or directly from peer entertainment devices. Each entertainment device can then display the eyes of each avatar pointing at the respective selected element of the environment, where those avatar's eyes are currently visible to the first user.

However, network delays may make the first form occasionally appear unresponsive due to network lag between devices. The second form therefore involves each user's entertainment device calculating and selecting the element of highest interest at least for each avatar whose eyes are currently visible to the first user, and then displaying the eyes of each such avatar pointing at the respective selected element of the environment. This places a greater computational load on each entertainment device, but avoids network lag.

It will be appreciated that a combination of these techniques may be used, such as for example using the first form by default, but if an entertainment device does not receive selected element information for a given avatar within a predetermined period from the start of a given update period, then that entertainment device will assume network lag is an issue and calculate the selected element for that avatar itself.

Similarly, there may be implementations in which only some avatars in the virtual environment are controlled by people, whilst others are so-called 'non-player characters', which are controlled by the entertainment device or an administrative server to provide a sense of atmosphere and/or to fulfil simple functions such as acting as a tour guide, shop assistant or moderator. In these circumstances only a subset of the visible avatars may be under the control of other entertainment devices, and so a combination of the techniques may be preferable.

Again similarly a user may choose to take a break for a while and cease actively controlling their avatar, whilst retaining their presence within the environment. Such a break can be automatically determined for example if no interaction with controls has been detected for a period of time, or if the user has removed their HMD (in a VR application), or if the user cannot be detected within the field of view of a camera used by the respective entertainment device. In such circumstances, the respective entertainment device may signal to other entertainment devices that they should temporarily take control of stimulating the interest exhibited by that avatar. Alternatively in this particular case, however, it may be preferable to clearly signal that the user is not engaged, rather than simulate the user's attentiveness. In this case when such a break is automatically detected, the avatar may instead be depicted as falling asleep, for example by closing its eyes, letting its head loll, and/or displaying some 'ZZZzzzz's above it.

In any event, where the calculation is deterministic based upon the state of the virtual environment and avatars, it will be appreciated that the results, whether calculated locally or received over the network, will be very similar or identical.

Hence the step of causing a representation of that given avatar's eyes to point at the selected element may comprise informing one or more remote devices of an identifier for that selected element, and/or may comprise updating a displayed presentation of the avatar or potentially a plurality of respective avatars within the virtual environment.

Regarding the at least one factor evaluated responsive to a relationship between the respective element and a given avatar, such factors includes one or more of the following, listed in no particular order.

Firstly, and as noted previously, a value indicative of whether the element is within the current field of view of the user represented by the given avatar. As noted previously, this factor may be evaluated separately as a first filter of which elements of the environment to calculate interest values for. Hence as a non-limiting example '0' may indicate that the element is out of the user's field of view.

It will be appreciated that for the avatars of other users, the field of view may have to be assumed based on the current orientation of the respective avatar's head as last indicated from received or calculated data describing the state of that avatar. This field of view may be a default assumed for all avatars, or may be set for a given avatar according to field of view information transmitted for that avatar's user, corresponding for example to the field of view of their respective head mounted display. Hence different avatars may have different respective fields of view depending on the virtual reality hardware worn by their users.

Similarly NPC avatars may have an assumed field of view based on the current orientation of the respective avatar's head.

Optionally where avatars (typically NPC avatars) are depicted as non-human and have different eye positions/configurations/numbers, different assumed fields of view can be associated with different classes of avatars.

Secondly, a value responsive to the distance of the element from the given avatar. If this value is used, then it may serve to demote elements that are further away from the given avatar, and promote elements that are in close proximity to the given avatar. The responsiveness to distance may be linear or non-linear. Again different classes of avatars may have different responsiveness; for example an NPC depicted as an elderly person may generate a lower value for the same distance compared to a younger avatar, to simulate myopia.

Likewise, accessories selected by a user may affect this or other values; hence a choice to wear eye-glasses may change the response to distance, whilst the choice to wear a so-called 'hoodie' may reduce their effective field of view.

Thirdly, a value indicative of whether or not there is an unobstructed line of sight between the given avatar and the element. If used, this may be used to simulate an avatar's awareness of an element within the environment. However, this value may be ignored if the element is also associated with a sound, for example.

Fourthly, a value proportional to the length of time the element has previously been selected as the most interesting element for the given avatar. If used, this value encourages an avatar to hold their interest in an element in preference to other elements, in a naturalistic manner. This value may be capped to prevent an avatar becoming fixated on an element of the environment.

Fifthly, where the element corresponds to another avatar, a value indicative of whether or not the user of that other avatar is on a friend list of the user the given avatar. If used, this encourages other avatars to appear to preferentially engage with their friend's avatars.

It will be appreciated that other factors may also be evaluated, including one or more of the following, listed in no particular order:

Firstly, one or more values respectively corresponding to one or more of a change in volume, position and behaviour of an element.

Hence a value could be made proportional to an absolute volume associated with an element, or relative volume, and/or a change in volume. Similarly a value can be made proportional to an absolute position of an element (for example if one user was near a 'goal'), or relative position to the first user's viewpoint (e.g. how close to the optical centre axis) and/or to a change in position. By extension a similar value could be determined for absolute, relative, and/or changes in velocity.

Secondly, a value proportional to the number of other avatars for which the element is currently selected as the most interesting.

This value can encourage a 'herd instinct' in certain circumstances, where the attention of several avatars on the same object can encourage the apparent curiosity of additional avatars. The original attention may be caused for example by a comment by one user to one or two others in the area, causing them to control avatars to centralise their viewpoint at the object of interest; objects that are the current subject of an avatar's interest can then optionally be tagged with a flag and/or number indicating how many avatars are currently interested in the object.

As was noted previously, in one embodiment each entertainment device informs the other entertainment devices what element of the environment has been selected as being of most interest to the avatar of their respective user. It then becomes straightforward for each entertainment device to tally how many times a given element has been selected amongst the entertainment devices to arrive at this value.

Alternatively or in addition, an entertainment device can calculate which element is of interest for one or more avatars, and use this information to influence the calculation of the element of interest for subsequent avatars within the virtual environment.

In either case, avatars whose apparent focus of interest is controlled by the local entertainment device may then be influenced by this value.

It will be appreciated that the term 'element' of the virtual environment may refer to an object in the virtual environment such as a person (avatar) or any other object, such as a car, a door, a camera, a pet or the like. However, the term need not be limited to this and may refer to a part of such an object, such as a car windscreen, a door handle, a camera lens, a pet's face or the like.

In the specific instance of an avatar, an element may be the eyes of the avatar (to make eye contact), the mouth of the avatar (for example to focus on this when the avatar is depicted as talking), or a hand or hands of the avatar (for example to track a hand when the avatar is depicted as gesticulating; for example if the avatar is mimicking a physical gesture of the user it represents).

The above factors in general relate to the determination of an instantaneous element of most interest (i.e. for the current frame or review period), and the technique suggests selecting that most interesting element. However, this runs the risk of the avatar's attention shifting rapidly between competing elements.

Several strategies may be considered either singly or in combination to address this issue.

As was noted previously, optionally one factor in determining the interest in a given element for an avatar is how long that element has already been the focus of interest for that avatar.

However, optionally the selected element may simply be selected for a predetermined minimum period of time. This imposes a form of hysteresis on the system so that equally interesting objects cannot be rapidly switched between by an avatar.

Optionally an element may be tagged with a flag indicating that if they become the subject of interest for an avatar, they should remain so for a predetermined period of time. It will be appreciated that different elements may be tagged to indicate different periods of time. Hence for example static objects may have no tag, whilst other avatars have a tag suggesting a comparatively long pause in the order of seconds to tens of seconds, depending on designer choice.

Optionally again, such a predetermined period of time may itself be overridden if an element of the environment is found to have a calculated interest value that exceeds the interest value of the current element by a predetermined threshold amount.

Alternatively or in addition, the system may keep a record of the most interesting element identified during each of the last N frames or review periods, and direct the avatar's attention to that element selected the most within that record. The last N frames or review periods can be selected to cover a period of time, for example in the range 0.5 to 5 seconds, and typically 1 second, and so the avatar will attend to the most interesting element overall during that period. Hence 'selecting the element with the highest calculated interest value' may refer to an instantaneous value or a cumulative value (in terms of the number of wins in a recorded period). This provides a rolling window of time within which to detect a cumulatively most interesting element. In turn this reduces the scope for the avatars eyes to rapidly shift between elements, whilst also reducing the scope for the avatars eyes to be fixed on a momentarily interesting element for too long. The above options to then look for a predetermined period of time may then optionally be applied to the overall winning element instead of an instantaneous winning element.

Similarly as was noted previously optionally one factor determining interest in a given element for an avatar is whether or not the element makes a sound or exhibits a change in volume.

In a similar manner, an attempt at communication may override attention to any current element of interest as follows.

When a first avatar is within a threshold distance of the centre of the assumed viewpoint of a second avatar, then if the user of the second avatar performs an input corresponding to the start of in-game communication (for example, beginning to speak, or to type, or call up an on-screen keyboard or dialogue menu or similar), then the second avatar is selected as the element of highest interest for the first avatar. This may be done by overriding the existing selection mechanism, or simply by assigning the second avatar with an interest value slightly higher than the current selected element of interest. Optionally this approach may be subject to the second avatar being within the assumed field of view of the first avatar, to simulate its potential for awareness of the user's intent to communicate.

In this way, whilst the first avatar may appear to be paying attention to another element of the virtual environment, when the user of the second avatar moves to position the first avatar roughly within the centre of their own field of view and begins to communicate, then the first avatar appears to focus its interest on them.

Such an approach may be used for example when interacting with non-player characters, or where an avatar that is controlled by another user is experiencing significant network lag, or where it appears that the other user is currently not actively controlling the avatar, as noted previously herein.

Changes to eye direction can be shown in several ways. When a moving element is the most interesting for an avatar, its eyes can track that object smoothly. When a new element is selected as the most interesting, an avatar can show a saccadic movement (jump in position) of the eye. This may include a blink action, so as to momentarily close the avatar's eyes, and then open them looking in the new direction. Blinking at other times may also be simulated. For certain objects of interest, special eye behaviour may be selected; for example when the eyes of a user's avatar (or the notional position of those eyes, in a first person view) are the focus of interest, then an avatar may be animated to show saccadic changes to look at one eye and then the other, and/or a middle point, over time.

It will be appreciated that the above methods may be carried out on conventional hardware (such as the Sony® PlayStation 4® or other videogame console, or a PC or other general-purpose computer) suitably adapted as applicable by software instruction or by the inclusion or substitution of dedicated hardware.

Thus the required adaptation to existing parts of a conventional equivalent device may be implemented in the form of a computer program product comprising processor implementable instructions adapted to cause a computer to perform some or all of the methods described herein, and optionally stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence in an embodiment of the present invention, an entertainment device 10 (such as the Sony® PlayStation 4®) is adapted to simulate avatar attention in a virtual environment, and comprises a processor (such as CPU 20A) that is adapted (for example by suitable software instruction) to, for a given avatar within the environment, periodically calculate the respective interest value of a plurality of elements in the virtual environment in dependence upon one or more factors, wherein at least one of said factors is evaluated responsive to a relationship between the respective element and that given avatar; select the element with the highest calculated interest value; and cause a representation of that given avatar's eyes to point at the selected element within the virtual environment.

As noted previously causing a representation of a given avatar's eyes appointed to select element may comprise transmitting information identifying that element to other entertainment devices, optionally via a server, for example using a combination of CPU 20A and a communication port such as Ethernet® port 32 or Wi-Fi® port 34. Alternatively may comprise updating the state of the virtual environment to depict the new direction of gaze of the given avatar, for example using a combination of CPU 20A and GPU 20B to create a rendered image for output, for example to the head-mounted display.

It will be appreciated that through suitable software instruction, such an entertainment device may implement the techniques and methods described herein. Hence for example as described previously herein the at least one factor evaluated responsive to a relationship between the respective element and that given avatar may include one or more selected from the list consisting of a value indicative of whether the element is within the current field of view of the user represented by the given avatar, a value responsive to the distance of the element from the given avatar, a value indicative of whether or not there is an unobstructed line of sight between the given avatar and the element, a value proportional to the length of time the element has previously been selected as the most interesting element for the given avatar, and where the element corresponds to another avatar, a value indicative of whether or not the user of that other avatar is on a friend list of the user the given avatar.

The invention claimed is:

1. A method of simulating avatar attention in a virtual environment, comprising the steps of:
    for a given avatar within the environment,
    periodically calculating respective interest values for each of a plurality of elements in the virtual environment in dependence upon one or more factors, wherein at least one of said factors is evaluated responsive to a relationship between the respective element and that given avatar;
    selecting the element with a highest calculated interest value among the respective interest values calculated for each of the plurality of elements in the virtual environment; and
    causing a representation of that given avatar's eyes to point at the selected element within the virtual environment, wherein the at least one of said factors includes a value proportional to the number of other avatars for which the element is currently selected as the element with the highest calculated interest value among the respective interest values,
    wherein the at least one factor evaluated responsive to a relationship between the respective element and that given avatar includes a value proportional to a length of time the element has previously been selected as a most interesting element for the given avatar.

2. The method of claim 1, in which the step of causing a representation of that given avatar's eyes to point at the selected element comprises informing one or more remote devices of an identifier for that selected element.

3. The method of claim 1, in which the step of causing a representation of that given avatar's eyes to point at the selected element comprises updating a displayed presentation of the avatar.

4. The method of claim 3, in which the method of simulating avatar attention is implemented for a plurality of respective avatars within the virtual environment.

5. The method according to claim 1, in which a default interest value assigned to one or more elements in the virtual environment.

6. The method according to claim 1, in which the at least one factor evaluated responsive to a relationship between the respective element and that given avatar includes one or more selected from the list consisting of:
    i. a value indicative of whether the element is within the current field of view of the user represented by the given avatar;
    ii. a value responsive to the distance of the element from the given avatar;
    iii. a value indicative of whether or not there is an unobstructed line of sight between the given avatar and the element;
    and
    v. where the element corresponds to another avatar, a value indicative of whether or not the user of that other avatar is on a friend list of the user the given avatar.

7. The method according to claim 1, in which the at least one of said factors includes one or more values respectively corresponding to one or more of a change in volume, position and behaviour of an element.

8. The method according to claim 1, in which the element is one selected from the list consisting of:
    i. the eyes of another avatar;
    ii. the mouth of another avatar; and
    iii. a hand of another avatar.

9. The method according to claim 1, wherein
   if the given avatar is within a threshold distance of the centre of the assumed viewpoint of another avatar, and
   if a user of a second avatar performs an input corresponding to an act of communication within the virtual environment,
   then the second avatar is selected as the element with the highest interest value in the virtual environment.

10. The method according to claim 1, in which the selected element is selected for a predetermined minimum period of time.

11. A non-transitory, computer readable recording medium having a computer program stored thereon, which when executed by a computer system, causes the computer system to carry out a method of simulating avatar attention in a virtual environment by, for a given avatar within the environment:
   periodically calculating respective interest values for each of a plurality of elements in the virtual environment in dependence upon one or more factors, wherein at least one of said factors is evaluated responsive to a relationship between the respective element and that given avatar;
   selecting the element with a highest calculated interest value among the respective interest values calculated for each of the plurality of elements in the virtual environment; and
   causing a representation of that given avatar's eyes to point at the selected element within the virtual environment, wherein the at least one of said factors includes a value proportional to the number of other avatars for which the element is currently selected as the element with the highest calculated interest value among the respective interest values,
   wherein the at least one factor evaluated responsive to a relationship between the respective element and that given avatar includes a value proportional to a length of time the element has previously been selected as a most interesting element for the given avatar.

12. An entertainment device adapted to simulate avatar attention in a virtual environment, comprising:
   a processor that is adapted to, for a given avatar within the environment,
   periodically calculating respective interest values for each of a plurality of elements in the virtual environment in dependence upon one or more factors, wherein at least one of said factors is evaluated responsive to a relationship between the respective element and that given avatar;
   select the element with a highest calculated interest value among the respective interest values calculated for each of the plurality of elements in the virtual environment; and
   cause a representation of that given avatar's eyes to point at the selected element within the virtual environment, wherein the at least one of said factors includes a value proportional to the number of other avatars for which the element is currently selected as the element with the highest calculated interest value among the respective interest values,
   wherein the at least one factor evaluated responsive to a relationship between the respective element and that given avatar includes a value proportional to a length of time the element has previously been selected as a most interesting element for the given avatar.

13. The entertainment device of claim 12, in which the processor is arranged to cause a representation of that given avatar's eyes to point at the selected element by transmitting to one or more remote devices an identifier for that selected element.

14. The entertainment device of claim 12, in which the processor is arranged to cause a representation of that given avatar's eyes to point at the selected element by updating a displayed presentation of the avatar.

15. The entertainment device of claim 12, in which the at least one factor evaluated responsive to a relationship between the respective element and that given avatar includes one or more selected from the list consisting of:
   i. a value indicative of whether the element is within the current field of view of the user represented by the given avatar;
   ii. a value responsive to the distance of the element from the given avatar;
   iii. a value indicative of whether or not there is an unobstructed line of sight between the given avatar and the element;
   and
   v. where the element corresponds to another avatar, a value indicative of whether or not the user of that other avatar is on a friend list of the user the given avatar.

* * * * *